US007532008B2

(12) United States Patent
Pendry et al.

(10) Patent No.: US 7,532,008 B2
(45) Date of Patent: May 12, 2009

(54) MATERIAL HAVING MAGNETIC PERMEABILITY AT R.F. FREQUENCY

(75) Inventors: John Brian Pendry, Cobham (GB); Ian Robert Young, Malborough (GB); Michael Charles Keogh Wiltshire, High Wycombe (GB); Joseph Vilmos Hajnal, London (GB); David James Larkman, London (GB); David John Gilderdale, South Devon (GB)

(73) Assignee: Ericsson AB, Stockholm (SE)

( * ) Notice: Subject to any disclaimer, the term of this patent is extended or adjusted under 35 U.S.C. 154(b) by 1528 days.

(21) Appl. No.: 10/311,962

(22) PCT Filed: Jun. 20, 2001

(86) PCT No.: PCT/GB01/02750

§ 371 (c)(1),
(2), (4) Date: Apr. 1, 2003

(87) PCT Pub. No.: WO02/03500

PCT Pub. Date: Jan. 10, 2002

(65) Prior Publication Data

US 2003/0155919 A1 Aug. 21, 2003

(30) Foreign Application Priority Data

Jun. 21, 2000 (GB) ................................ 0015067.2

(51) Int. Cl.
*G01V 3/00* (2006.01)

(52) U.S. Cl. ....................................... 324/318; 324/300

(58) Field of Classification Search ................. 324/300, 324/318, 322

See application file for complete search history.

(56) References Cited

U.S. PATENT DOCUMENTS 4,951,688 A 8/1990 Keren (Continued)

FOREIGN PATENT DOCUMENTS

GB 2 346 485 A 8/2000

(Continued)

OTHER PUBLICATIONS

D. I. Hoult, "Rotating Frame Zeugmatography", Journal of Magnetic Resonance, vol. 33, pp. 183-197, 1979.

(Continued)

*Primary Examiner*—Louis M Arana
(74) *Attorney, Agent, or Firm*—Kirschstein, et al

(57) ABSTRACT

A material having magnetic permeability at r.f. frequency, for example a microstructured magnetic material has a magnetic permeability of negative value but unity magnitude over a particular r.f. frequency range. The singularity in the flux pattern has the result that magnetic resonant disturbances in a plane C,E normal to the line C,D are focussed into a plane D,F also normal to the line C,D and vice versa. This is particularly applicable to magnetic resonance apparatus, since the material can be used to transfer the r.f. magnetic flux distribution in a target region in a patient, for example at C,E to D,F where the flux may be directly measured by receive coils. Equally, transmit coils may generate flux to be focussed into the target region by the material. Magnetic resonance apparatus may be constructed which does not require gradient coils, and r.f. hypothermia may be carried out in a focussed way, minimising damage to surrounding tissue.

19 Claims, 4 Drawing Sheets

U.S. PATENT DOCUMENTS

| | | | | |
|---|---|---|---|---|
| 5,916,162 | A | 6/1999 | Snelten et al. | |
| 6,608,811 | B1 * | 8/2003 | Holden et al. | 361/303 |
| 6,768,051 | B2 * | 7/2004 | Wiltshire et al. | 174/391 |
| 6,791,432 | B2 * | 9/2004 | Smith et al. | 333/99 S |

FOREIGN PATENT DOCUMENTS

| | | | |
|---|---|---|---|
| WO | WO 99 50929 | A | 10/1999 |
| WO | WO 00 41270 | A | 7/2000 |
| WO | WO 01/67553 | A1 | 9/2001 |

OTHER PUBLICATIONS

Peter Styles et al., "A Method for Localizing High-Resolution NMR Spectra from Human Subjects", Magnetic Resonance in Medicine, vol. 2, pp. 402-409, 1985.

Magnetism from Conductors and Enhanced Nonlinear Phenomena by J B Pendry et al., IEEE Transactions on Microwave Theory and Techniques, vol. 47, No. 11, Nov. 1999, pp. 2075 to 2084.

The Electrodynamics of Substances with Simultaneously Negative Values of ∈ and μ by V. G. Veselago, P N Lebedev Physics Institute, Academy of Sciences, USSR, Usp Fiz Nauk 92, 51-7-526 (Jul. 1964), Soviert Physics USPEKHI, vol. 10, No. 4, Jan.-Feb. 1968, pp. 509 to 514.

Physics World Jun. 2000, p. 27.

A Composite Medium with Simultaneously Negative Permeability and Permittivity, D.R. Smith et al., Phys. Rev. Letters 84, (18), 4184-7, May 2000.

Simultaneous Acquisition of Spatial Harmonics (SMASH); Fast Imaging with Radio Frequency Coil Arrays, Daniel K. Sodickson et al. MRM38: 591 to 603 (1997).

* cited by examiner

MATERIAL HAVING MAGNETIC PERMEABILITY AT R.F. FREQUENCY

This invention relates to materials having magnetic permeability at r.f. frequencies.

Materials comprising an array of non-magnetic elements having capacitance and inductance and spaced by distance much smaller than the wavelength at which the magnetic permeability is exhibited, which may be termed microstructured magnetic materials, have been proposed (Magnetism from Conductors and Enhanced Nonlinear Phenomena by J B Pendry, A J Holden, D J Robbins and W J Stewart, IEEE Transactions on Microwave Theory and Techniques, Volume 47, No. 11, November 1999, pages 2075 to 2084, and International Patent Application WO 00/41270).

Referring to FIG. 1, which shows the variation of the real and imaginary component of magnetic permeability at varying radio frequencies of such a microstructured magnetic material, it will be seen that the real part of the magnetic permeability goes negative between the frequencies $\omega_0$ and $\omega_P$. The resonant frequency $\omega_0$ corresponds to a peak in the imaginary component of the magnetic permeability. The heights of the peaks of the real and imaginary components vary with the resistivity of the non-magnetic elements and, generally, a high imaginary component of magnetic permeability is undesirable since it implies losses in the microstructured magnetic material i.e. absorption of the r.f. energy.

International Patent Application No. PCT/GB01/00968 proposes a screen made of such microstructured magnetic material, in which the real part of the magnetic permeability is zero or negative over the band of r.f. frequencies over which the screen is effective.

Before the advent of the microstructured magnetic materials referred to, materials with a negative real part of magnetic permeability did not exist. Nevertheless, it was suggested (The Electrodynamics of Substances with Simultaneously Negative Values of $\in$ and $\mu$ by V G Veselago, P N Lebedev Physics Institute, Academy of Sciences, USSR, Usp Fiz Nauk 92, 517-526 (July 1964), Soviet Physics USPEKH, Volume 10, No. 4, January-February 1968, pages 509 to 514) that such a material, if also possessing negative permittivity $\in$, could produce a substance with refractive index of unity magnitude but negative sign. (It was acknowledged that such materials did not exist). Referring to FIG. 2, the paper gives an example of such a system with a plate 1 of thickness d bringing light from point source A located at a distance l (l<d) from the plate 1 to a focus at point B located at a distance d−l behind the plate. It will be noted that incident ray i is refracted into ray r on the "wrong" side of the normal n, as a consequence of the material having a negative refractive index. This has also been discussed in Physics World June 2000 page 27.

Recently an experiment has been done which implies that materials with both negative magnetic permeability $\mu$ and permittivity $\in$ would indeed result in a material with negative refractive index (A composite medium with simultaneously negative permeability and permittivity, D R Smith, Willie J Padilla, D C Vier, S C Nemat-Nasser, S Schultz, Phys. Rev. Letters 84, (18), 4184-7, May 2000).

The invention provides a material having magnetic permeability at r.f. frequency, wherein the real part of the magnetic permeability is negative with magnitude unity over a particular r.f. frequency band.

The applicants have appreciated that valuable properties result in a material designed to interact with an r.f. magnetic field, which material has the specified magnetic permeability over the particular frequency band, in a near field, quasi magnetostatic, situation, even if the permittivity is not negative, in particular, if the permittivity is positive. Focussing properties are produced below the normal resolution limit when the material is in a medium having magnetic permeability positive with magnitude unity such as air.

In general, the focussing properties would be produced if the material had any magnitude of negative magnetic permeability in a medium of positive magnetic permeability of the same magnitude.

Accordingly, the invention also provides a material having magnetic permeability at r.f. frequency, in a medium, wherein the real part of the magnetic permeability of the material is negative and the real part of the magnetic permeability of the medium is positive, both material and medium having the same magnitude of magnetic permeability.

Advantageously, the material is accompanied by a coil tuned to the said particular r.f. frequency band, which coil is spaced from the material. The material may be a slab and the coil may be spaced from the slab by half the thickness of the slab. The coil may be for receiving r.f. signals, transmitting r.f. signals, or both.

Advantageously, the material consists of an array of elements having inductance and capacitance, the element dimension and their spacing being smaller than the wavelength of the radiation in the particular band of r.f. frequencies. However, it would be possible to have a medium in which the self inductance or capacitance was provided locally, and the other was distributed. The elements are preferably non-magnetic, because this makes their use possible in magnetic resonance imaging and spectroscopy, but the elements could be magnetic for other applications.

The capacitive elements may be in the form of conductive sheets wound as a spiral, or a plurality of stacked planar sections each of which is electrically isolated form each other and is in the form of a spiral. The further preferred features of the method are disclosed and claimed in International Patent Application WO 00/41270,the contents of which is incorporated herein by reference.

Ways of carrying out the invention will now be described in detail, by way of example, with reference to the accompanying drawings, in which.

Like parts have been given like reference numerals in all the drawings.

Figure 3:
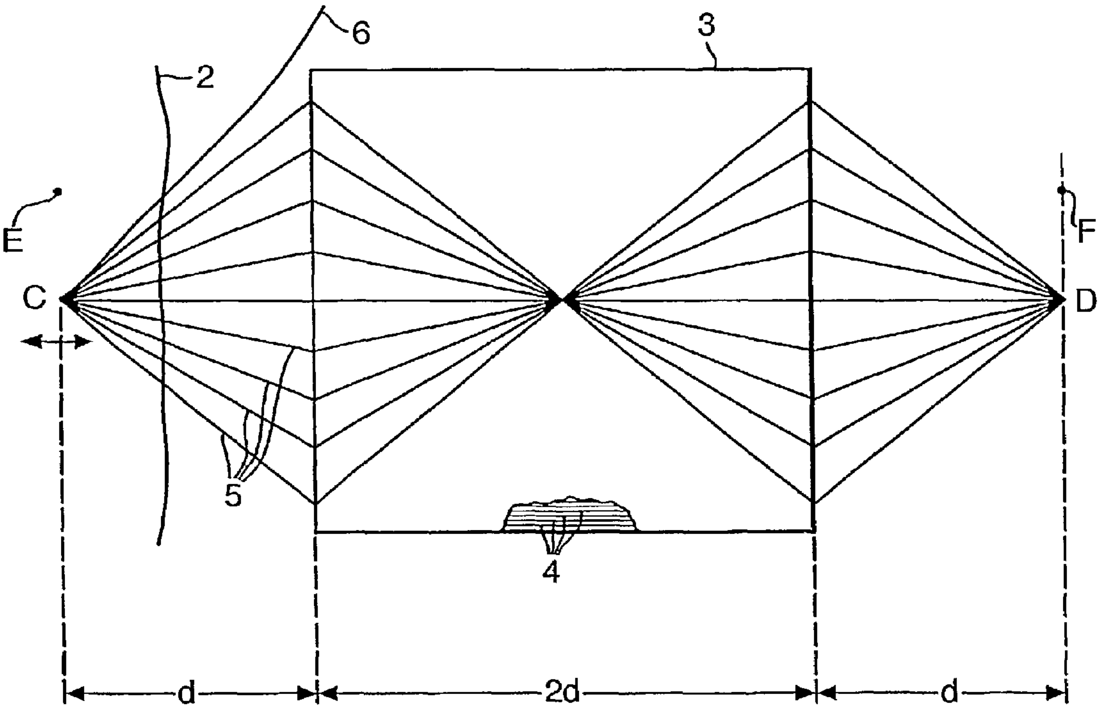
FIG. 3 is a schematic diagram showing the focussing of lines of magnetic flux by a material having magnetic permeability according to the invention.

Referring to FIG. 3, point C represents a magnetic dipole orientated in the direction of the double-headed arrow shown and oscillating in the radio frequency region. It could for example represent a resonating nucleus in the body of a patient 2. A cylindrical block 3 of microstructured magnetic material is placed in front of the patient. The axis of the block is parallel to the axis of the dipole at C. The block 3 may be composed of an array of "Swiss roll" capacitors, as described in the IEEE paper referred to, with the axis of the Swiss rolls (shown schematically by the reference numeral 4 in a fragmentary region of the block) being orientated parallel to the axis of the dipole C and the line C, D. The "Swiss rolls" are constructed of thin conducting layers separated by insulating film, rolled onto a non-magnetic mandrel. When a radio frequency magnetic field passes down the axis of the roll, a current induced that can only flow by virtue of the self-capacitance of the structure. Because the structure is much smaller than the wavelength of the radiation, it appears to be a uniform medium whose permeability (the response to the magnetic field) depends inter alia on the capacitance of the microstructure. An alternative construction for the micro-structured material 3 could be layers of stacked planar sections, also described in the IEEE paper.

The stacked planar sections would be arranged in arrays arranged in planes perpendicular to the axis of the dipole and the line C,D.

The lines emanating from point C, some of which carry the reference numeral 5 represent lines of magnetic flux generated by the oscillating dipole, and are shown as being straight between the point C and the adjacent face of the block 3 for convenience, although they will actually follow the classical pattern of lines of force from a magnet, in that the line of force 6 is actually shown with a curvature.

In accordance with the invention, the real part of the magnetic permeability of the block is negative and has magnitude unity, over a particular r.f. frequency band in the of the axis of the block.

The magnetic permeability of air is unity and has a positive sign, but the magnetic permeability of a human body approximates quite well to the value for air, and it follows that the block interfaces with regions towards the point C and towards the point D which have a magnetic permeability of unity and of positive sign. The result of this is to produce a singularity in the flux pattern, is that lines of force 5 emanating from point C are actually guided through point D, in what can be described as focussing. This would also apply if the magnitude of the negative magnetic permeability of the block was equalled in value by the positive magnetic permeability of the medium outside the block, for a value other than unity.

While the real component of the magnetic permeability of the block $\mu=-1$, it is desirable that the imaginary component of $\mu$ is small, otherwise the material will be lossy, which would result in deterioration in the focussing properties, and the generation of heat. Hence, referring to FIG. 1, it is preferred that a value of $\mu=-1$ is used nearer to $\omega_P$ than $\omega_0$.

One therefore has the remarkable result that r.f. magnetic flux from a dipole C within a patient is reproduced at point D, outside the patient. The same would be true of the magnetic flux from a dipole at point E, which would be reproduced at point F, assuming that the block was moved accordingly. Flux is shown emanating from point C and being focussed at point D but the intention is to receive flux from a small sensitive region in the (object) plane containing C,E i.e. normal to the axis of the cylinder 3 and to focus it in the (image) plane D, F, again normal to the axis of the cylinder.

The distance between C and the incident face of the block 3, and the distance between the point D and the emergent face of the block 3 is equal and amounts to half the axial depth of the block.

The distribution of r.f. magnetic field in the plane through the points C and E and at right angles to the plane of the drawing is reproduced in the plane of similar orientation through the points F and D.

This has enormous significance in the field of magnetic resonance imaging, because in the past it would have been necessary to measure the field generated by resonating nuclei C, E in a body 2 by surrounding the body with a coil or placing a coil or coils on the surface of the body. With the arrangement of the invention, an array of coils can be arranged in the plane containing D and F, and the flux at C and E can be directly measured.

It is necessary for the block to be sized to capture the lines of flux from as much as possible of the entire area it is desired to image. For example, the line of flux 6 from the point C will be lost by the block 3 with the size shown.

It will be understood that in magnetic resonance imaging, a strong magnetic field is set up in a region of interest in a patient, and pulses of r.f. energy are directed to the region to excite magnetic resonant active nuclei such as hydrogen protons to resonance, so that they act as resonating dipoles of the kind illustrated at point C. The signals emitted by the excited region are picked up by a receive coil and analysed. To enable the distribution of protons to be indicated, subsidiary magnetic fields, aligned in the direction of the main magnetic field but varying, for example, across the plane containing the point C and E are generated, in order to separate the spatial position of the protons in an image plane by reference to the slight variations in the resonant frequencies emitted. Thus, an array of small coils in the plane D, F enables the distributed flux emitted to be picked up.

In a first embodiment, magnetic resonance signals emitted from the circular area bounded by point C and E and orientated normal to the axis of the cylinder are picked up a circular coil bounded by the points D, F arranged in a plane normal to the axis C, D. The magnetic field gradients referred to, for example in two directions at right angles in the plane of that circular area are used to enable the distribution of protons over that area to be recorded and then processed as an image.

However, because the flux distribution in the target plane C, E is reproduced in the coil plane D,F, in another preferred embodiment, an array of coils are arranged in the plane D,F, and there is no need for means for generating magnetic field gradients in order to record the distribution of the resonating protons. The magnetic gradient coils normally present in a magnetic resonance imaging apparatus can therefore be discarded, with a space saving in the region occupied by the patient which is normally of restricted volume.

As an alternative to using an array of coils over the area D,F, a single coil could be scanned, or other means could be used to record the pattern of the resonating r.f. signals over the area D, F.

Techniques are available when an array of coils is used which enable image space to be under-sampled by relying on coil relative position and sensitivity profiles to generate missing data (Simultaneous Acquisition of Spatial Harmonics (SMASH); Fast Imaging with Radio Frequency Coil Arrays, Daniel K Sodickson, Warren J Manning, MRM38: 591 to 603 (1997)). This reduces image acquisition time. In a preferred embodiment, this technique of SMASH is used in conjunction with an array of coils in the plane D,F to reduce image acquisition time. It should be possible to minimise noise amplification due to poor conditioning of the coil sensitivity matrices.

As described thus far, magnetic resonance imaging apparatus using the cylindrical block 3 for focussing can only image in one particular slice of the patient. Conventional slice selection procedures can be used to selectively access different planes. This is done by setting up a magnetic field gradient in the direction C, D and using different frequencies of exciting r.f. frequencies to excite only those nuclei in the plane of interest. The detector coil can be moved in a direction along the axis C, D manually, or the coils could have a third dimension with, ideally, a sensitivity profile which is substantially constant over the range of depths to be interrogated. Of course, the relationship of half the block thickness for the source and the sensor will then be broken, but focussing to a greater or lesser degree should in fact take place over a range of depths, with a 1:1 correspondence between the two values of d on either side of the block. It would be expected that performance on either side of the correct dimensions would in fact become degraded to some extent.

The coils will, in general, be quite small, so as to exploit the spatial encoding possibilities, and coil noise tends to predominate in these circumstances even at quite large values of the main field. For this reason, it is preferred that the coils are refrigerated and, preferably, superconducting, so as to minimise noise due to them. As the coils are small, it is likely that even in high fields the coil noise could be the dominant factor, and so these measures are desirable even in circumstances in which they are normally considered irrelevant. Moreover, the relative remoteness of the detector coils from the target region from which data is to be obtained means that the usual problems of bringing refrigerated containers very close to patients are avoided. The space needed for insulation which normally results in less than optimal filling factor with cryogenic coils is eliminated by the use of the microstructured magnetic material, as d can be set so that, when the coils are correctly positioned, the cryostat needed can be accommodated.

The relationship between the coil plane flux space, and the target (data source) flux space means that it will be possible to match coil area to that of target tissue. In the case of whole body spectroscopy where data is typically acquired from a small region, though noise is generated from the whole region to which the coil is sensitive, this means an immediate potential gain in signal-to-noise ratio per unit time. There is also a gain of signal-to-noise implicit in the imaging case mentioned above, since, when a large array of small coils is used, the data bandwidth through any one coil is reduced compared to what it would have to be in more conventional circumstances.

The sensitive volume to be imaged, in the vicinity of point C, may be excited in any conventional way, for example, by the use of a body coil or a coil on the surface 2 of the patient. However, it is also possible to excite the sensitive volume to resonance by means of the coil or array of coils in the coil plane D, F. If the coil or array of coils are used for receive in such a way as to obviate the need for magnetic field gradients then the r.f. field generated in the sensitive volume by means of the coils in the coil plane can be simpler and the time for excitation can be reduced.

The use of the microstructured material is not restricted to magnetic resonance imaging, that is, producing an image in the coil plane of the flux in the source plane C, E, but also extends to spectroscopy in which a spatial image is not produced, but the interest resides in the analysis of the frequency content of the resonating flux in the sensitive volume, in order to obtain information about the tissue types present and their relative quantities. The signal-to-noise gain implicit in the focussing of the coils on the sensitive region and no other, unlike a conventional body coil, for example, applies equally to a spectroscopic examination. In the case where the r.f. excitation of the sensitive volume is carried out by transmit coils in the coil plane D, F, a further gain is attained since only the region of interest is excited, and contamination from unwanted resonances in regions surrounding that region of interest is avoided. Normally this is a problem in spectroscopy.

Note that the gain to be expected in spectroscopy arises for any nucleus that might be the subject of study.

In spectroscopy, in particular, where contamination from unwanted resonances from regions surrounding the site of interest is a huge problem, this ability could be very important indeed.

Other applications include the use of the microstructured material to focus radiation at a site in order to decouple spins at that site without exposing the body as a whole to high levels of irradiation, which might risk violating safety criteria. With some forms of the microstructured material (notably the stacked planar (printed circuit) formulation), it is possible to arrange for desirable flux manipulation at two different frequencies in the same structure. The printed circuit form of the material involves significant spacing between layers, and another structure can be interleaved between these. This arrangement allows enhanced performance in whatever direction in two nuclei at the same time, which is an important feature of multinuclear spectroscopy. Note that the two systems do not have to be doing the same thing—one could simply be flux guiding/enhancing with a substantial positive $\mu$, while the other is focussing with a $\mu=-1$.

Thus, for example, if one was doing a spectroscopy measurement to detect the presence of phosphorus or carbon, in a normal magnetic resonance experiment the presence of hydrogen atoms nearby would cause the resonance of the phosphorus and carbon lines to split into two or more lines. If one applied an r.f. excitation to hydrogen using the guiding properties of the structure, a simpler resonance would be accomplished and more precise results in the detection of phosphorous and carbon achieved.

Potential applications of the magnetic resonance apparatus described include cardiac and liver imaging and spectroscopy, studies of the spine, prostate with or without local coils, imaging of the inner ear, pituitary gland, and the use in endoscopes.

The block D need not be of the cylindrical form referred to i.e. with its end faces normal to its axis. Thus, for example, the ends of the block could be shaped in order to vary the focussing effects, that is, the location of the object and image planes, although not the magnetic permeability. The block may be made of any material whose magnetic permeability is unity and negative in sign, and, in particular, from any of the microstructured materials described in the IEEE paper, when adjusted in size for the frequencies of operation found in magnetic resonance, which typically lie in the region 3 MHz to 100 MHz.

Figure 1:
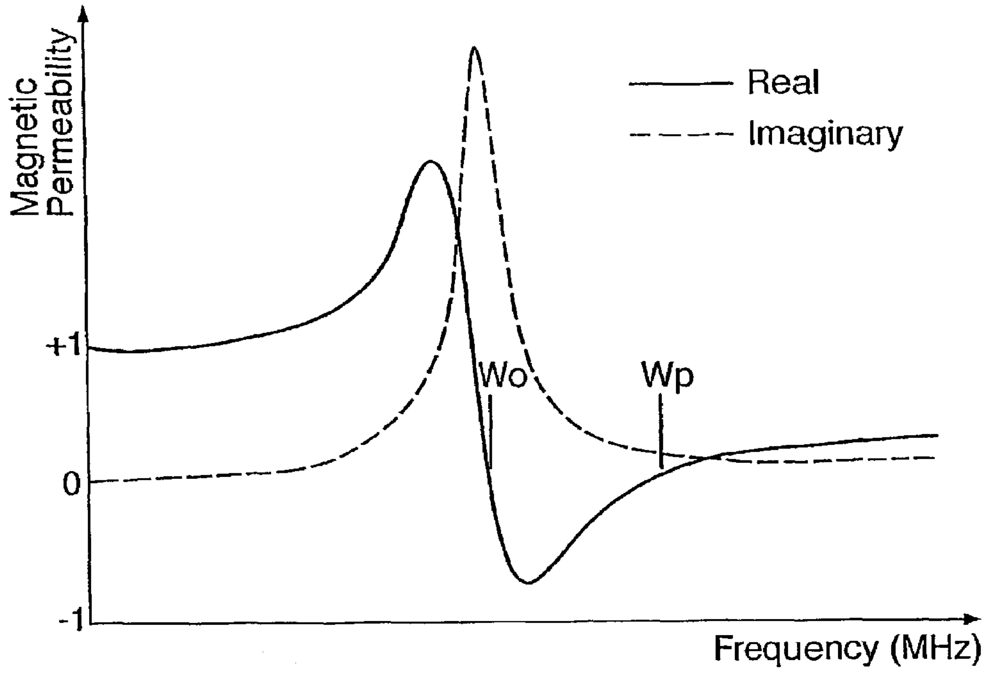
FIG. 1 shows the variation of the real and imaginary part of magnetic permeability of known microstructured materials in accordance with r.f. frequency.
Figure 2:
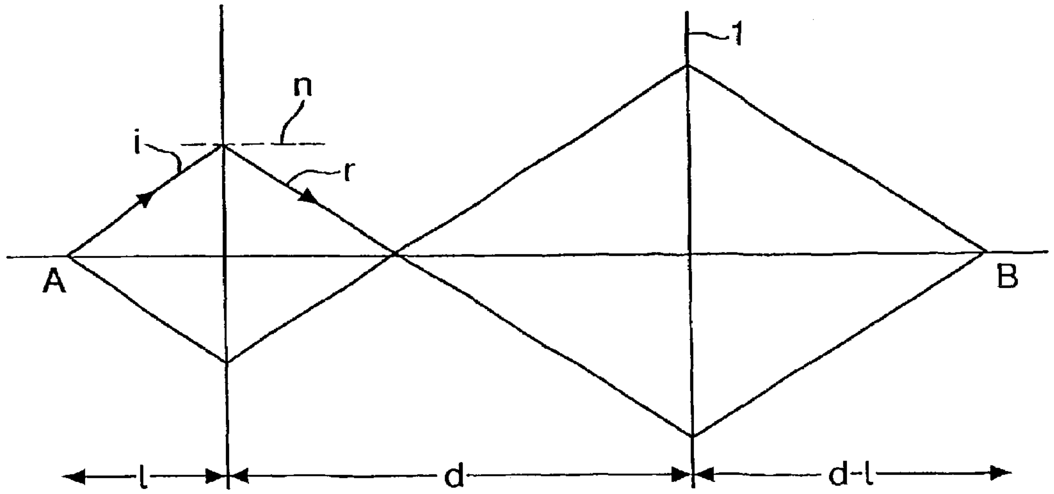
FIG. 2 is an optical ray diagram predicted by theory for a plate having a negative refractive index.

As a specific example of the use of Swiss rolls, a typical example of suitable dimensions is as follows. The Swiss rolls are made using 12 micron thick aluminium foil with a 45 micron backing film of permittivity $\in=3$, wound onto an 8 mm diameter mandrel. There are 38.25 turns, and this is expected to give a magnetic permeability $$\mu=-1+4.10^{-3}i$$

at 21.3 MHz. This has fo=19.65 MHz and fp=23.45 MHz, where $\omega_0=2\pi f_0$ and $\omega p=2\pi fp$ (FIG. 1). There are empirical factors for the effective radius of the roll and for the filling fraction or packing density. One possible arrangement is a hexagonal close packed lattice i.e. as closely packed as possible.

In the case of printed elements, suitable dimensions are as follows. The elements could be double spirals as disclosed in FIG. 5 of co-pending International Patent Application No. PCT/GB01/00957. These could be printed on FR4 board of thickness 0.5 mm. The conducting arms of the spiral have an internal radius of 10 mm, a width of 0.5 mm, a separation of 0.1 mm and a resistivity of 3.3 ohm per metre (0.5 ounce copper). 14.8 turns give a magnetic permeability $$\mu=-1+3.10^{-3}i$$

at 21.3 MHz. A better approach would be to incorporate a tunable dielectic between the spiral arms. For an 8 turn spiral, the permittivity $\in$ would need to be $\in$=11.4 to give a magnetic permeability $$\mu=-1+4\cdot 8.10^{-3}i$$

at 21.3 MHz.

While the description has been for measuring r.f. magnetic flux in a human body, the invention is applicable to other living creatures, and any other measurement of nonliving material.

Figure 4:
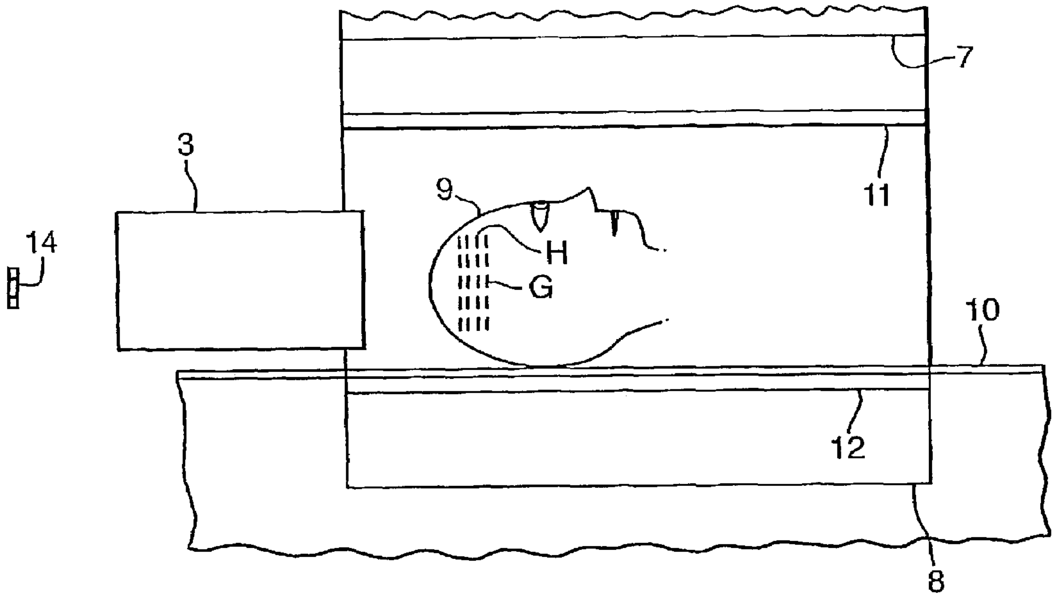
FIG. 4 is a fragmentary schematic side view of magnetic resonance apparatus using the material of the invention, viewed across the lines 4-4 in FIG. 5.
Figure 5:
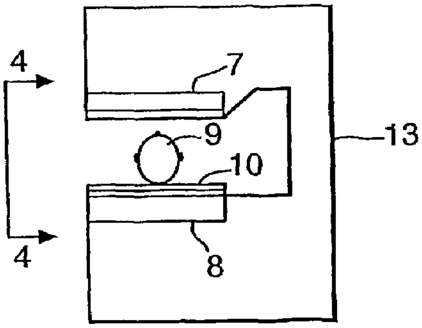
FIG. 5 is a schematic end view, on a smaller scale, of the magnetic resonance apparatus of FIG. 4.

Referring to FIGS. 4 and 5, a specific application of the use of the microstructured material will now be described.

An open magnet is shown in end view in FIG. 5, and has pole pieces 7 and 8 spaced on either side of an examination region in which a head 9 is shown. The patient rests on couch 10 which can be slid relative to the pole pieces at right angles to the plane of FIG. 5, in order to enable different parts of the patient's anatomy to be brought to the sensitive region between the pole pieces 7 and 8. Gradient coils 11 and 12 permit magnetic field gradients to be set up in the sensitive region, in order to enable magnetic resonance imaging to take place. The pole pieces 7 and 8 are interconnected by flux return path 13. The pole pieces may be permanent magnets and/or high temperature superconducting magnets, and the magnet may include resistive or superconducting electromagnets.

In the application to the use of the microstructured magnetic material, a block 3 of microstructured magnetic material is positioned in line with the axis of the patient.

While not drawn to scale in FIG. 4, the block 3 has axial length 2*d*, a desired plane to be imaged G is spaced axially by distance d from the block and a receive coil 14 is also spaced by distance d from the block. Imaging is then carried out as described above in relation to FIG. 3. To image plane H the block is moved and, if the coil 14 does not have sensitivity in an axial direction, this is moved as well. The resonating protons are encoded in the area of the planes H, G etc. by means of the gradient coils 11, 12. The receive coil 14 is shown symbolically and may actually consist of an array of coils. As has been made apparent in relation to FIG. 3, the fact that the flux in the plane being investigated such as H,G is distributed in the plane bearing the receive coil 14 makes it possible to eliminate the gradient coils. Thus, the gradient coils 11,12 may be omitted, and this is clearly an advantage since it increases the space available to the patient and/or permits the pole pieces 7,8 to be brought closer, resulting in a cost reduction in the magnet. It will be necessary to retain gradient coils in the slice select direction. In the phase-encode and frequency encode directions, in principle it is possible to discard any, or all, gradients, but there are resolution issues which may demand retention of some gradient coil capacity.

The use of the microstructured material is not of course limited to such open magnets, and it could equally be brought up to the end of the bore of a resistive or superconducting solenoidal magnet to image regions of the head for example as is illustrated in FIGS. 4 and 5.

Various further developments of the general arrangement described with reference to FIGS. 3 to 5 will now be described.

Figure 6:
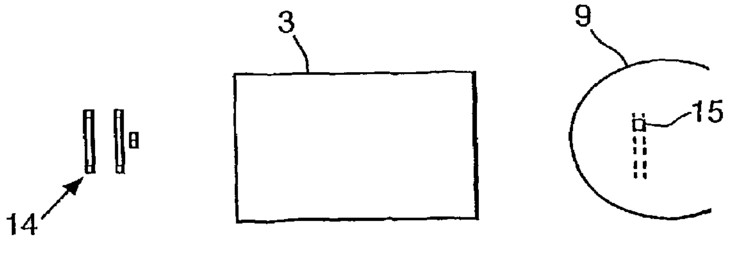
FIG. 6 shows a part of a variant of the magnetic resonance apparatus shown in FIG. 4.

Referring to FIG. 6, the arrangement is the same as FIGS. 4 and 5 except as regards the r.f. coil 14 and the region of the patient to be excited.

In the embodiment of FIG. 6, the coil 14 is chosen to perform rotating frame zeugmatography (D I Hoult, J Magn Reson. 33, 183-197 (1979), P Styles, C A Scott, G R Radela, Magn. Reson. Med. 2, 402-409 (1985)), that is, by the use of more than one coil for transmit (excitation) purposes, energy is concentrated into a single voxel 15 or group of voxels by virtue of cancellation of the r.f. signal outside that volume due to the signal being in opposed phases. Thus, only one voxel 15 may be excited. This is already known, but the difference here is only a small coil is necessary to pick up the signal from the voxel after focussing by the cylinder of microstructured material 3. The small coil is shown schematically to the right of the two transmit coils. The small coil is of high temperature superconductor to reduce the noise still further. If r.f. zeugmatography is performed conventionally, a much larger surface receive coil is needed, related to the depth in the patient being studied, and hence a lot of noise is picked up as well as the desired signal.

Again referring to FIG. 6, a somewhat similar application is in vivo microscopy. In conventional microscopy, a high gradient is used so that only a small portion of a region of interest is imaged. The coils for r.f. zeugmatography can be used again, firstly, to excite only a small volume and secondly, using the small receive coil, to pick up signal just from the excited region, thereby minimising noise from other regions. Again, the small receive coil can advantageously be refrigerated. Very large local r.f. gradients can be generated (r.f. fields with statically varying amplitude and/or phase, since the material structure is small) because they only have to be made very close to small coils which are remote from the body, before refocussing them as desired.

Figure 7:
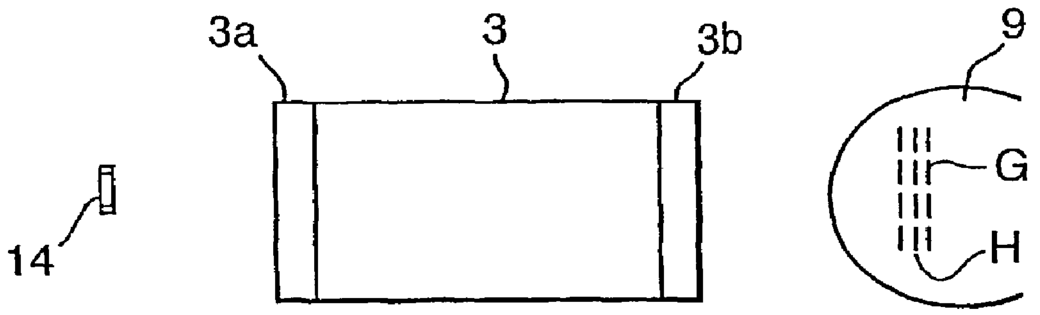
FIG. 7 shows a part of another variant of the magnetic resonance apparatus shown in FIG. 4.

In another modification shown in FIG. 7, the effective axial depth of the block 3 can be varied by constructing the block from the stacked planar section (printed circuit) version described.

The applicants have proposed (International Patent Application No. PCT/GB01/00957), a material in which the magnetic properties of a microstructured material are switchable. The contents of this earlier patent application is incorporated herein by reference. The permittivity $\in$ of a dielectric may be changed by means of a voltage in order to change the magnetic permeability of the microstructured material.

The switchable material could be contained within the regions 3*a* and 3*b* of the block 3. Such regions could be switched from a magnetic permeability of negative sign and unity value to one of positive sign and unity value. Thus, a first plane G in a patient may be imaged by making the region 3*a* have a magnetic permeability of $\mu$=+1. Then, to image the next plane along H, one or more layers at the extreme right hand end of the block may be switched to permeability $\mu$=+1 and the same number of layers of the region 3*a* where it adjoins the region 3 may be switched to permeability $\mu$=−1. In this way, a volume of the patient could be scanned through by translating the $\mu$=−1 region through the distance 3*a*,3*b*. It would be necessary for the coil 14 to move in association with this scanning, or to have depth sensitivity.

Figure 8:
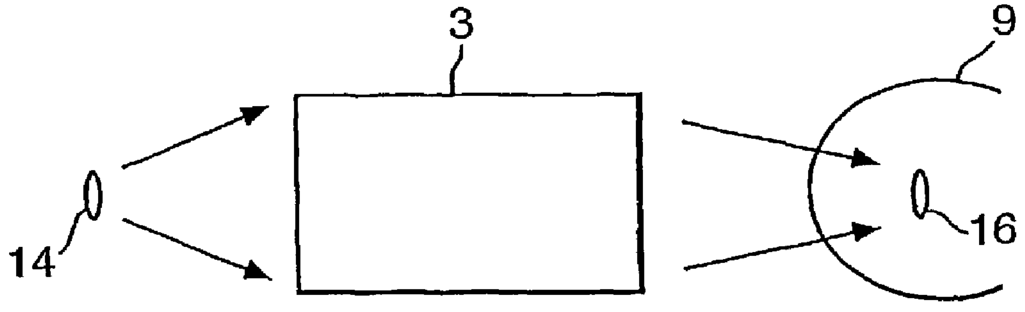
FIG. 8 shows a part of a further variant of the magnetic resonance apparatus shown in FIG. 4.

In order to thermally ablate lesions such as tumours in the body, it is generally necessary to focus the energy in question, in order to avoid damage to healthy tissue. For this reason ultrasound is favoured for this application because it is relatively easy to focus. Thermal ablation using radio frequency energy has been attempted using aerials outside the body, but it has not proved particularly effective because it is not possible to control the radiation pattern at a depth in the body to any very great degree, so that it is not possible to concentrate energy locally so as to thermally damage malignant tissue much more effectively than surrounding normal structures. The use of the microstructured material solves this problem (FIG. 8), because a source of r.f. energy i.e. a coil 14 generates a flux pattern which is reproduced at a depth d behind the microstructured cylinder 3 of axial length 2*d*, where it can be arranged that the tumour 16 to be destroyed is positioned. In this way, energy from a localised source external to the body can be deposited very selectively into a small localised region of cancerous tissue.

The invention claimed is:

1. A material having magnetic permeability at radio frequency (RF), wherein the magnetic permeability has a negative real part with magnitude unity over a particular RF band.

2. The material as claimed in claim 1, in combination with a coil tuned to the particular RF band, wherein the coil is spaced from the material in a medium having a magnetic permeability which is positive with magnitude unity.

3. The material as claimed in claim 2, in which the coil is spaced from the material by half depth of the material in a direction from the material to the coil.

4. The material as claimed in claim 2, in which the coil is a receive coil.

5. The material as claimed in claim 2, in which the coil is a transmit coil.

6. The material as claimed in claim 1, in which the material consists of an array of elements having inductance and capacitance, the elements having a dimension and spacing that are smaller than a wavelength of radiation in the particular RF band.

7. The material as claimed in claim 6, in which the elements are non-magnetic elements.

8. The material as claimed in claim 1, in which the material comprises a structure with magnetic properties comprising an array of capacitive elements, wherein each element includes a low resistance conducting path and is such that a magnetic component of electromagnetic radiation lying within the particular RF band induces an electrical current to flow around said path and through a respective element, and wherein the elements have a size and a spacing apart from each other to provide the magnetic permeability in response to the electromagnetic radiation in the particular RF band.

9. The material as claimed in claim 8, in which each capacitive element is in a form of a conductive sheet wound as a spiral.

10. The material as claimed in claim 8, in which each capacitive element comprises a plurality of stacked planar sections each of which is electrically isolated from each other and is in a form of a spiral.

11. The material as claimed in claim 10, in which the capacitive elements are switchable in order that the magnetic permeability of the respective planar section is switched to a value other than the negative value of magnitude unity, and in which the part of the material having the magnetic permeability of the negative value but unity magnitude is translatable through a portion of a depth of the material.

12. A material having magnetic permeability at radio frequency (RF) in a medium, wherein the magnetic permeability of the material has a negative real part, and wherein the medium has a magnetic permeability with a positive real part, the magnetic permeabilities of both the material and the medium having a same magnitude.

13. A magnetic resonance apparatus including a material having magnetic permeability at radio frequency (RF), wherein the magnetic permeability has a negative real part with magnitude unity over a particular RF band, and wherein the material is arranged between a target region and RF means.

14. The magnetic resonance apparatus as claimed in claim 13, in which the RE means is an RF receive coil.

15. The magnetic resonance apparatus as claimed in claim 14, in which the RE receive coil is refrigerated.

16. The magnetic resonance apparatus as claimed in claim 13, in which the RF receive coil is operative to receive RF magnetic flux distributed in an area of the RF receive coil, the RF magnetic flux being reproduced and distributed over an area of the target region to obviate need for magnetic field gradient coils.

17. The magnetic resonance apparatus as claimed in claim 13, in which the RE means is a transmit coil.

18. The magnetic resonance apparatus as claimed in claim 17, in which the transmit coil is operative to excite a small volume.

19. The magnetic resonance apparatus as claimed in claim 17, in which the transmit coil is operative to ablate thermally a desired part of the target region.

* * * * *

UNITED STATES PATENT AND TRADEMARK OFFICE

CERTIFICATE OF CORRECTION

PATENT NO. : 7,532,008 B2
APPLICATION NO. : 10/311962
DATED : May 12, 2009
INVENTOR(S) : Pendry et al.

It is certified that error appears in the above-identified patent and that said Letters Patent is hereby corrected as shown below:

In Column 1, Line 39, delete "USPEKH," and insert -- USPEKHI, --, therefor.

In Column 3, Line 30, insert -- direction --, before "of the axis".

In Column 6, Line 58, delete "$\omega_0=2\pi f_0$" and insert -- $\omega_0=2\pi fo$ --, therefor.

In Column 7, Line 22, insert -- a --, before "couch".

In Column 7, Lines 48-59, delete "As has been made apparent ............ some gradient coil capacity." and insert the same in line 49, as a new paragraph.

In Column 9, Line 23, in Claim 3, after "half" insert -- a --.

In Column 10, Line 28, in Claim 14, delete "RE" and insert -- RF --, therefor.

In Column 10, Line 30, in Claim 15, delete "RE" and insert -- RF --, therefor.

In Column 10, Line 38, in Claim 17, delete "RE" and insert -- RF --, therefor.

Signed and Sealed this

Twentieth Day of October, 2009

David J. Kappos

David J. Kappos
*Director of the United States Patent and Trademark Office*